Jan. 13, 1925.
B. H. HOWARD ET AL
FEEDER FOR INGOT MOLDS
Filed Dec. 1, 1924
1,523,214
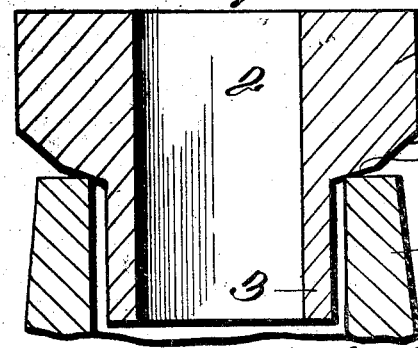
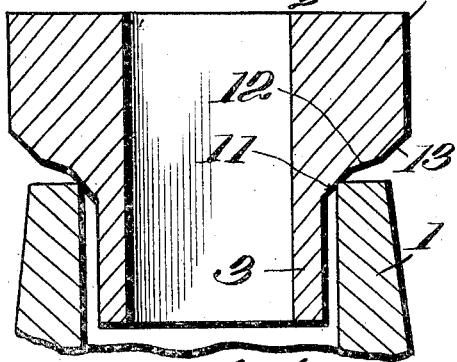
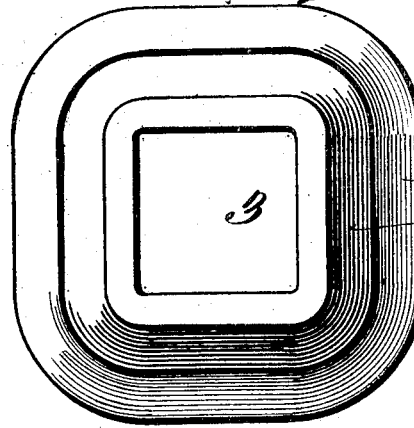
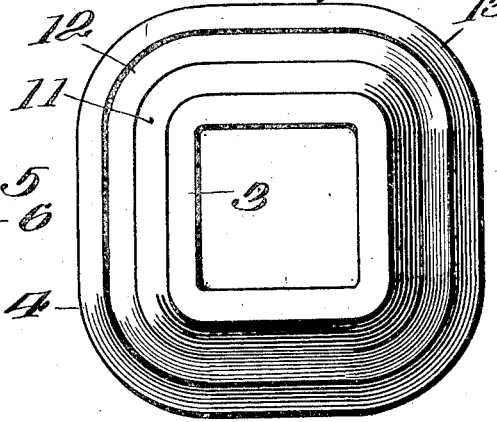
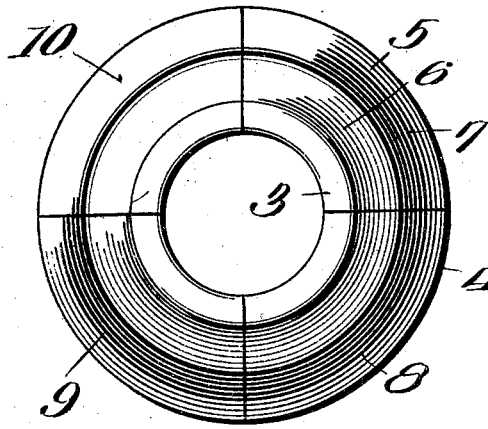
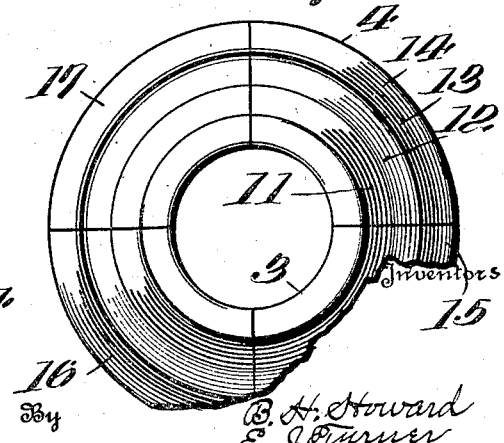

Patented Jan. 13, 1925.

1,523,214

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 1, 1924. Serial No. 753,161.

*To all whom it may concern:*

Be it known that we, BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds.

The object of our invention is to provide a feeder for ingot molds adapted to rest upon the upper end of the mold, and having a portion extending into the bore of the mold whereby "piping" is prevented and segregation is reduced to a minimum.

Another object of our invention is to provide a feeder of this character in which the upper end is provided with a thickened portion to provide for a sufficient amount of refractory material to retain the heat at the upper end of the mold and the ingot, and at the same time providing means for supporting the feeder in the upper end of the mold.

A further object of our invention is to provide a feeder of this character adapted to tightly fit on the upper end of the mold, the bores of which vary slightly, and adapted to have a wedging action to tightly hold the feeder on the mold.

A still further object of our invention is to provide a simple, cheap and effective feeder having certain details of structure and combination of parts hereinafter more fully set forth.

In the accompanying drawings:

Figure 1 is a vertical sectional view of a mold showing our improved feeder applied thereto.

Figure 2 is a bottom plan view of the feeder.

Figure 3 is a bottom plan view embodying the form of feeder shown in Figures 1 and 2.

Figure 4 is a vertical sectional view of a mold showing our improved feeder applied thereto in a modified form.

Figure 5 is a bottom plan view of the form of feeder shown in Figure 4.

Figure 6 is a bottom plan view of a circular feeder showing the same principle as that shown in Figures 4 and 5.

Referring now to the drawings, 1 represents the mold and 2 the feeder, which as shown is of a tubular form having the thin portion 3 extending into the bore of the mold, and a thickened portion 4 at its upper end. This thickened portion provides a large amount of refractory material to retain the heat at the upper end of the mold to prevent piping and segregation in the ingot, and also serve as means for supporting the feeder on the upper end of the mold. The lower face of the enlarged portion 4 has two faces 5 and 6 which terminate at the outer periphery of the thin or neck portion 3 of the feeder. By this structure it will be seen that there is a wedging action between the upper end of the mold and the face 6 of the enlarged portion 4. If the mold was of a diameter to engage the face 5 of the thickened portion 4 there would also be a wedging action to cause the feeder to center itself in the mold and be held against lateral movement.

In the modification shown in Figure 3, the same principle is employed, except that the feeder is made in a circular form and in four sections 7, 8, 9 and 10, the thickened portion having two surfaces the same as that shown in Figures 1 and 2 and like reference numerals indicate like parts.

In the modification shown in Figure 4, the cylindrical body portion 3 is provided with the thickened upper end 4, the lower face of which is provided with three faces 11, 12, and 13 whereby the feeder is tightly held in the bore of the mold regardless of the diameter of the bore of the mold.

In the modification shown in Figure 6, we have shown a circular sectional feeder made in four sections 14, 15, 16 and 17, and each section having the thickened portion 4 the same as that shown in the other figures, having its lower end provided with three surfaces the same as shown in Figures 4 and 5.

Having thus fully described our invention what we claim is:—

1. A feeder for ingot molds comprising a tubular body portion having a thickened upper end, the lower face of said thickened portion having a series of plane surfaces.

2. A feeder for ingot molds comprising a tubular body portion having a thickened portion, the lower surface of which is connected with the tubular portion by a series of plane faces.

3. A feeder for ingot molds comprising a tubular body portion having a thickened portion, the lower face of the thickened portion having a plurality of surfaces extending from the outer face of the thickened portion to the outer face of the thinner portion.

4. A feeder for ingot molds comprising a tubular body portion made of several sections, and having enlarged portions, the lower faces of the enlarged portions having a series of plane surfaces.

5. A feeder for ingot molds comprising a tubular body portion formed of a series of sections having enlarged upper portions, and having their lower faces provided with a series of plane surfaces.

6. A feeder for ingot molds comprising a tubular body portion made of refractory material, a relatively thick upper portion, a relatively thin lower portion, these two portions connected by a series of plane surfaces.

In testimony whereof we affix our signatures.

BLOOMFIELD H. HOWARD.
ERNEST J. TURNER.